United States Patent
Whitmore et al.

(10) Patent No.: US 11,760,699 B2
(45) Date of Patent: Sep. 19, 2023

(54) METHOD OF ALTERING A SURFACE OF A CERAMIC MATRIX COMPOSITE TO AID IN NODULE REMOVAL

(71) Applicant: Rolls-Royce High Temperature Composites Inc., Cypress, CA (US)

(72) Inventors: Christopher Whitmore, Newport Beach, CA (US); Stephen Harris, Long Beach, CA (US); Sungbo Shim, Irvine, CA (US); Timothy Western, Sunset Beach, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 448 days.

(21) Appl. No.: 16/924,742

(22) Filed: Jul. 9, 2020

(65) Prior Publication Data
US 2021/0009480 A1    Jan. 14, 2021

Related U.S. Application Data

(60) Provisional application No. 62/873,319, filed on Jul. 12, 2019.

(51) Int. Cl.
*C04B 41/51*   (2006.01)
*C04B 41/87*   (2006.01)
(Continued)

(52) U.S. Cl.
CPC ...... *C04B 41/5183* (2013.01); *C04B 41/0081* (2013.01); *C04B 41/4523* (2013.01);
(Continued)

(58) Field of Classification Search
CPC ............ C04B 41/0081; C04B 41/4523; C04B 41/5183; C04B 41/87; C04B 2235/616; C04B 2235/3873
See application file for complete search history.

(56) References Cited

U.S. PATENT DOCUMENTS 4,572,848 A * 2/1986 Pollak .................. C04B 35/573
                                                        118/271
5,571,758 A   11/1996 Grossman
(Continued)

FOREIGN PATENT DOCUMENTS

CN    103332662 A  * 10/2013
JP    H11263668 A  *  9/1999

OTHER PUBLICATIONS

Arjan Ciltja et al., "Wettability of Silicon with Refractory Materials: A Review," dated Feb. 2008, pp. 1-37, Norwegian University of Science and Technology, Trondheim, Norway.

*Primary Examiner* — Nathan H Empie
(74) *Attorney, Agent, or Firm* — Crowell & Moring LLP

(57) ABSTRACT

A method of altering a surface of a ceramic matrix composite to aid in nodule removal is described. A fiber preform comprising a framework of ceramic fibers is heated to a temperature at or above a melting temperature of silicon. During the heating, the fiber preform is infiltrated with a molten material comprising silicon. After the infiltration, the fiber preform is cooled, and the infiltrated fiber preform is exposed to a gas comprising nitrogen during cooling. Silicon nitride may be formed by a reaction of free (unreacted) silicon at or near the surface of the infiltrated fiber preform with the nitrogen. Thus, a ceramic matrix composite having a surface configured for easy nodule removal is formed. Any silicon nodules formed on the surface during cooling may be removed without machining or heat treatment.

5 Claims, 2 Drawing Sheets

(51) Int. Cl.
  *C04B 41/00* (2006.01)
  *C04B 41/45* (2006.01)
  *C04B 41/50* (2006.01)

(52) U.S. Cl.
  CPC .......... *C04B 41/5066* (2013.01); *C04B 41/87* (2013.01); *C04B 2235/3873* (2013.01); *C04B 2235/616* (2013.01)

(56) References Cited

U.S. PATENT DOCUMENTS

| | | | |
|---|---|---|---|
| 6,077,607 A * | 6/2000 | Zornik | F16D 65/127 |
| | | | 427/430.1 |
| 2017/0015592 A1* | 1/2017 | Gray | C04B 35/80 |

* cited by examiner

METHOD OF ALTERING A SURFACE OF A CERAMIC MATRIX COMPOSITE TO AID IN NODULE REMOVAL

RELATED APPLICATION

The present patent document claims the benefit of priority under 35 U.S.C. § 119(e) to U.S. Provisional Patent Application No. 62/873,319, which was filed on Jul. 12, 2019, and is hereby incorporated by reference in its entirety.

TECHNICAL FIELD

The present disclosure relates generally to the fabrication of ceramic matrix composites (CMCs) and more particularly to altering CMC surfaces to aid in nodule removal.

BACKGROUND

Ceramic matrix composites, which include ceramic fibers embedded in a ceramic matrix, exhibit a combination of properties that make them promising candidates for industrial applications, such as gas turbine engines, that demand excellent thermal and mechanical properties along with low weight. A ceramic matrix composite that includes a silicon carbide matrix reinforced with silicon carbide fibers may be referred to as a silicon carbide/silicon carbide composite or SiC/SiC composite. Fabrication of SiC/SiC composites typically includes a melt infiltration step in which a SiC fiber preform is exposed to molten silicon, which is drawn into the (porous) fiber preform via capillary forces and reacts to form the SiC matrix. Molten silicon exhibits an approximately 11% volumetric expansion upon solidification, and thus excess silicon can bulge through the preform surface during cooling, forming Si surface nodules that can negatively impact dimensional tolerances of the ceramic matrix composite (CMC). In addition, the Si surface nodules can serve as crack initiation sites and cause premature failure of the CMC. The Si surface nodules may be strongly adhered to the CMC surface and thus difficult to remove. It may be necessary to subject the CMC to potentially damaging machining or heat treatment steps to extract the Si surface nodules from the CMC surface. It would be beneficial to develop an approach to mitigate these surface defects.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

Figure 1:
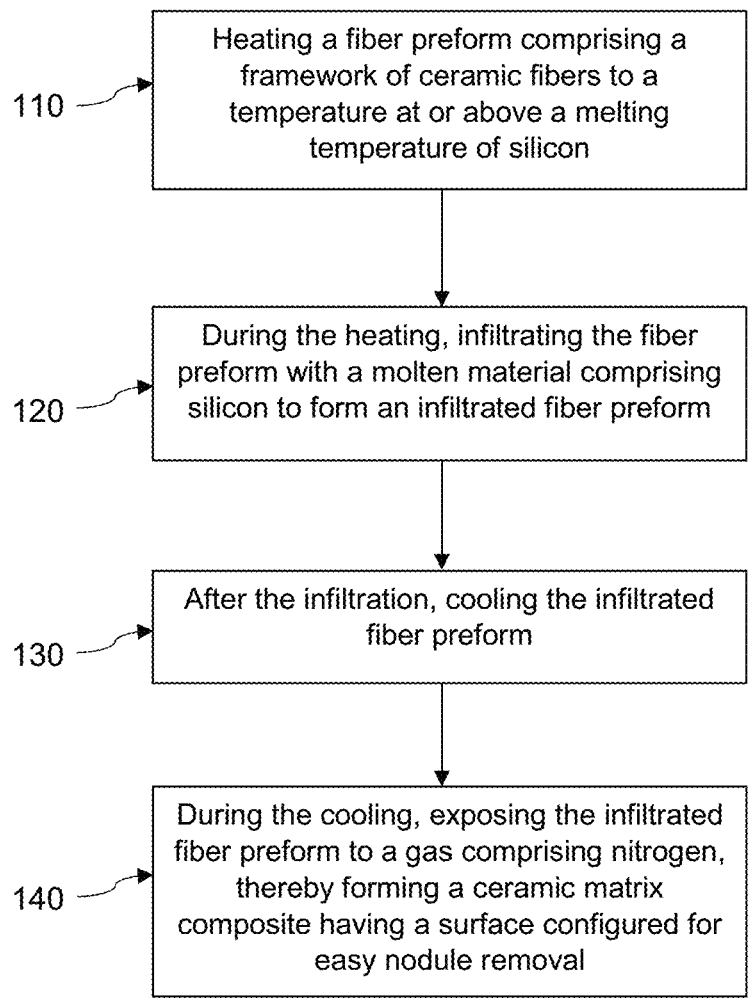
FIG. 1 shows a flow chart of the method.

A method of altering a surface of a ceramic matrix composite to aid in the removal of Si surface nodules is described in this disclosure. Referring to the flow chart of FIG. 1, the method comprises heating 110 a fiber preform comprising a framework of ceramic fibers to a temperature ("melt infiltration temperature") at or above the melting temperature of silicon (1414° C.). During the heating, the fiber preform is infiltrated 120 with a molten material comprising silicon, and an infiltrated fiber preform is formed. After infiltration, the infiltrated fiber preform is cooled 130. During the cooling, the infiltrated fiber preform is exposed to a gas comprising nitrogen (N), and free (unreacted) silicon at or near the surface of the infiltrated fiber preform reacts with nitrogen, enabling the formation of silicon nitride. More specifically, free silicon within about 100 nm of the surface of the infiltrated fiber preform may undergo nitridation to form a surface layer comprising silicon nitride (or "silicon nitride surface layer"). Due to the low wettability of molten silicon on silicon nitride, as discussed below, any silicon nodules that form upon cooling may have a highly spherical shape with low adhesion to the surface layer. Thus, a ceramic matrix composite (CMC) having a surface configured for easy nodule removal may be formed.

The gas comprising nitrogen may comprise, for example, ammonia ($NH_3$) or nitrogen gas ($N_2$). The gas may also include an inert gas such as Ar, He, or Ne. Because the silicon nitride surface layer is formed from a reaction between nitrogen and free silicon present at or near the surface of the fiber preform, the surface layer is typically a nanoscale layer with a thickness in a range from about 1 nm to about 100 nm, and more typically about 1 nm to about 20 nm. In addition, the surface layer may be continuous or discontinuous across the surface of the fiber preform, depending on the distribution of free silicon following melt infiltration. For example, if the free silicon is localized to a number of discrete regions across the surface, nitridation may occur locally, leading to formation of a discontinuous surface layer during cooling. Alternatively, free silicon may be concentrated at or near the surface across an entirety of the surface, such that nitridation is widespread, leading to formation of a continuous surface layer during cooling of the fiber preform. At or above the melting temperature of silicon, the free silicon is molten and thus flowable over the surface. Typically, free silicon is present in the ceramic matrix composite in an amount of about 20 vol. % or less, as explained below.

During cooling, molten silicon from an interior of the infiltrated fiber preform may be pushed outward due to the volume expansion described above, such that silicon nodules are formed on the surface of the ceramic matrix composite, which may be covered in part or in full by the silicon nitride surface layer. It is understood that a silicon nodule described as being on the surface of the ceramic matrix composite may also be on the silicon nitride surface layer, which may lie between the silicon nodule and the surface. The silicon nodules that form during cooling may consist essentially of silicon or a silicon alloy, i.e., the silicon nodules may consist of elemental silicon or a silicon alloy along with any incidental impurities. Also or alternatively, the silicon nodules may have a core-shell structure, where a coating comprising silicon nitride overlies a core consisting essentially of silicon or a silicon alloy. The coating comprising silicon nitride (or "silicon nitride coating") may form on some or all of the nodules as a consequence of exposure to nitrogen as molten silicon bulges through the surface of the infiltrated fiber preform during cooling. Individual silicon nodules may be nearly fully encapsulated by the silicon nitride coating, with the exception of an interfacial region between the silicon nodule and the surface (or the surface layer) that may avoid nitridation. Like the silicon nitride surface layer that may form on the surface of the CMC, the silicon nitride coating may have a nanoscale thickness in a range from about 1 nm to about 100 nm, and more typically from about 1 nm to about 20 nm.

Advantageously, any silicon nodules that form on the surface of the CMC may be readily removed by cleaning or scraping without excess force. This is due at least in part to the relatively high contact angle of the silicon nodules with respect to the silicon nitride surface layer. Accordingly, the method may further include, after cooling, removing any silicon nodules from the surface of the CMC without machining or heat treatment.

Figure 2:
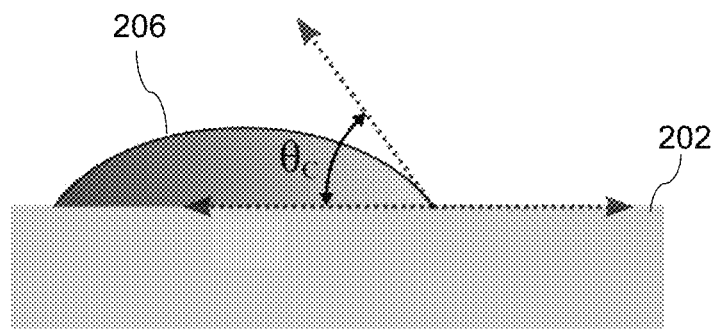
FIG. 2 illustrates how the contact angle between a liquid and a solid is determined.
Figure 3:
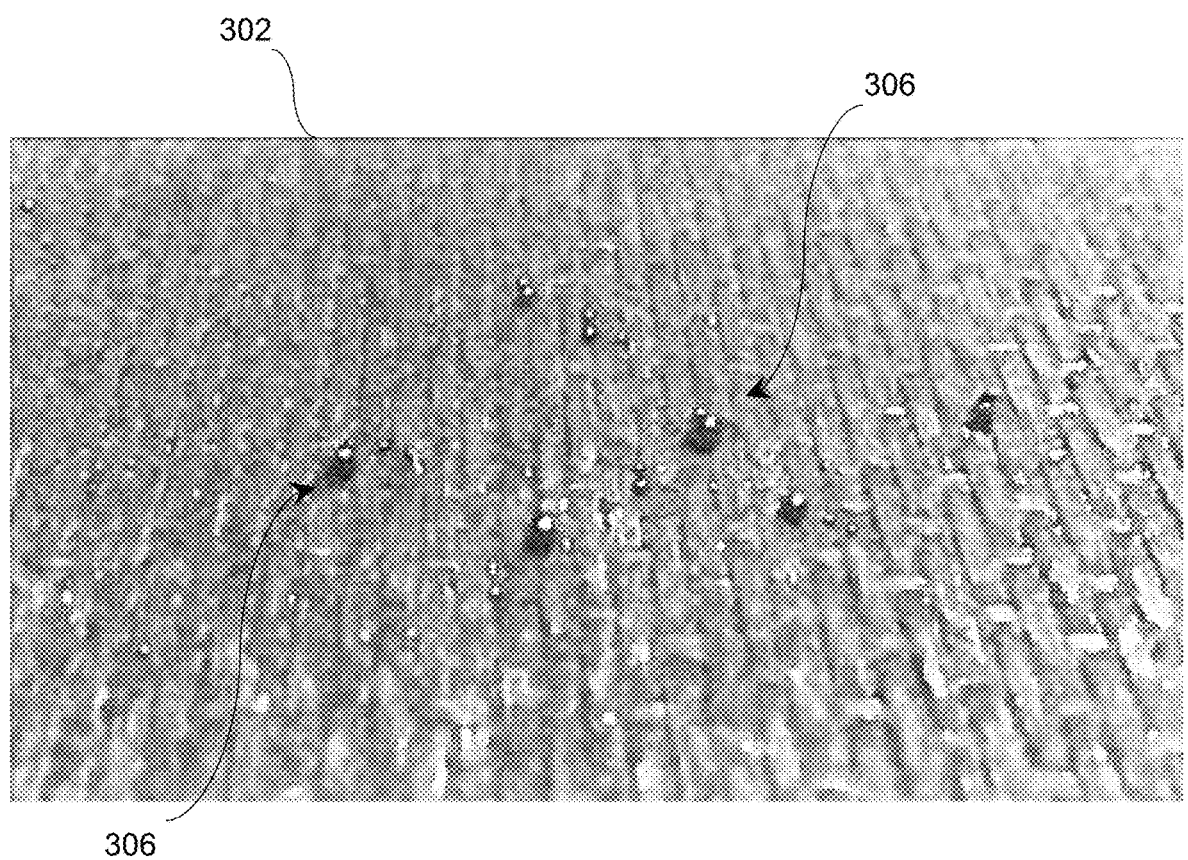
FIG. 3 is an image of substantially spherical nodules formed at the surface of a SiC/SiC matrix composite.

The contact angle ($\theta_c$) of a liquid 206 with a solid 202 may be defined as shown in FIG. 2 and provides a measure of the wettability of the solid 202 by the liquid 206 when the two are placed in contact. In this case, the solid 202 shown schematically in FIG. 2 may represent a surface layer comprising silicon nitride, and the liquid 206 may represent molten silicon. Data from various sources published in Ciftja, Arjan et al., "Wettability of Silicon with Refractory Materials: A Review" (Norwegian University of Science and Technology, Trondheim, February 2008, p. 18) suggest that the contact angle of molten silicon on silicon nitride substrates may be as high as 134° depending on the atmosphere and substrate preparation. Accordingly, the contact angle of molten silicon on the surface during cooling may be at least about 90°, or at least about 105°. At high contact angles, the molten material, which is either molten silicon or a silicon-rich alloy, does not wet or strongly adhere to the surface layer; thus, any silicon nodules that form can be readily removed. This is substantiated by FIG. 3, which shows an image of substantially spherical silicon surface nodules formed upon cooling a melt-infiltrated fiber preform in a nitrogen-rich atmosphere. A "substantially spherical" silicon nodule may be understood to be spherical except for the interfacial region where the silicon nodule is attached to the surface or surface layer. The substantially spherical silicon nodules are loosely bound to the surface of the CMC, which in this example is a SiC/SiC composite. As described above, the silicon nodules may consist essentially of silicon or a silicon alloy, or may include include a silicon nitride coating over a core consisting essentially of silicon or a silicon alloy.

After melt infiltration, the infiltrated fiber preform is cooled from the melt infiltration temperature to ambient temperature (e.g., about 20-25° C.) over a time period that typically ranges from 20 minutes to 2 hours. The exposure to the gas comprising nitrogen may occur during an entirety of the cooling to ambient temperature. Alternatively, the exposure to the gas comprising nitrogen may occur during only an initial phase of the cooling, e.g., from the melt infiltration temperature to a second temperature above ambient temperature. The second temperature may be, in one example, at or above about 1200° C. After reaching the second temperature, exposure to the gas comprising nitrogen may be halted, and the (partially cooled) infiltrated fiber preform may be exposed to a vacuum or an inert gas atmosphere (e.g., Ar, He, and/or Ne) for the duration of the cooling. The term "vacuum" or "vacuum conditions" may be understood to refer to a pressure of less than 1 Torr (about 100 Pa) and preferably less than $1\times10^{-3}$ Torr (about 0.1 Pa). Accordingly, the cooling of the infiltrated fiber preform may occur in two phases, where nitridation occurs during an initial phase of the cooling, and where final solidification to form the ceramic matrix composite occurs in a final phase of the cooling to ambient temperature. It should be noted that exposure to the gas comprising nitrogen may be avoided during melt infiltration, as premature surface nitridation can inhibit the infiltration process.

The heating and the cooling may take place in a controlled environment, such as in a vacuum system or furnace configured to maintain vacuum or controlled pressure conditions while temperature is also controlled. The heating that accompanies melt infiltration may be carried out in a controlled environment comprising a vacuum or an inert gas atmosphere. At least the initial phase of the cooling (if not the entirety of the cooling process) may take place in a gaseous atmosphere comprising nitrogen, such as a $N_2$ atmosphere or a $NH_3$ atmosphere, and optionally including an inert gas. The final phase of the cooling may take place in a vacuum or an inert gas atmosphere as described above. Prior to heating and/or cooling, the vacuum system or furnace may be pumped to a desired vacuum level and optionally backfilled with a desired pressure of an inert and/or reactive gas. For example, a low pressure gaseous atmosphere (e.g., less than 500 Pa, or from about 200-400 Pa) may be utilized. The controlled environment is preferably substantially devoid of oxygen; in other words, the controlled environment does not include oxygen beyond unavoidable impurity levels.

The molten material infiltrated into the fiber preform during heating to the melt infiltration temperature may comprise or consist essentially of silicon or a silicon alloy (e.g., a silicon-rich alloy). As indicated above, the melt infiltration temperature is at or above the melting temperature of silicon, which is 1414° C. Thus, the melt infiltration temperature is typically in a range from about 1414° C. to about 1500° C. The fiber preform is held at the melt infiltration temperature during the entirety of the infiltration process. Typically, melt infiltration is carried out for a time duration of 15 minutes to four hours, and more typically from one to three hours, depending in part on the size and complexity of the CMC to be formed. The cooling is initiated by cessation or reduction of the heating that accompanies melt infiltration, and may entail active cooling and/or passive cooling. The speed at which cooling takes place may be controlled at least in part by the furnace settings.

During melt infiltration and cooling, a ceramic matrix is formed from ceramic particles in the fiber preform as well as from ceramic reaction products created during reactions between the molten material and any reactive elements in the preform. The reactive element(s) may include carbon (e.g., graphite, carbon black, diamond) and/or refractory metals such as molybdenum, tungsten, and/or titanium. Since the reactive elements react with the molten material during melt infiltration, the amount of unreacted or free silicon in the ceramic matrix composite is typically about 20 vol. % or less.

The fiber preform employed in the method comprises a three-dimensional framework of ceramic fibers, which may be arranged in tows. The framework may be formed by, in one example, laying up plies comprising tows of ceramic fibers arranged in a two- or three-dimensional weave. The method may further comprise, before or after forming the framework, forming an interface coating on the ceramic fibers to provide a weak fiber-matrix interface once the CMC is formed, which can be beneficial for fracture toughness. The method may also include forming a rigidized fiber preform by depositing a matrix material such as silicon carbide on the fiber preform via chemical vapor infiltration or another deposition process known in the art. Prior to melt infiltration, the fiber preform, which may be a rigidized fiber preform as described above, may be infiltrated with a slurry comprising ceramic particles and optionally reactive elements to form an impregnated fiber preform, i.e., a fiber preform loaded with particulate matter. Typically, the fiber preform that undergoes melt infiltration is an impregnated fiber preform. The impregnated fiber preform may comprise a loading level of particulate matter from about 40 vol. % to about 60 vol. %, with the remainder being porosity. The majority of the particulate matter comprises the ceramic particles, and from about 2 wt. % to about 12 wt. % of the particulate matter may be reactive elements, such as carbon.

The ceramic fibers that serve as the framework of the fiber preform typically comprise silicon carbide, but may also or alternatively comprise another ceramic, such as silicon nitride, alumina, or aluminosilicate, or carbon. Preferably, the ceramic fibers are silicon carbide fibers, and the ceramic matrix composite includes a matrix comprising silicon carbide. Thus, the ceramic matrix composite may be referred to as a SiC/SiC composite. The ceramic matrix composite may form part or all of a component of a gas turbine engine, such as a blade or vane. Using the approach described herein, a ceramic matrix composite (CMC) component having a surface configured for nodule removal may be fabricated. Accordingly, the CMC component may comprise a ceramic matrix composite including a ceramic matrix reinforced with silicon carbide fibers, where the ceramic matrix comprises silicon carbide, and where the ceramic matrix composite includes a surface layer comprising silicon nitride. The surface layer may be discrete or continuous over the surface of the CMC. The surface layer may also or alternatively comprise a thickness in a range from about 1 nm to about 100 nm, and/or have any of the characteristics set forth above.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of altering a surface of a ceramic matrix composite to aid in nodule removal, the method comprising: heating a fiber preform comprising a framework of ceramic fibers to a temperature at or above a melting temperature of silicon; during the heating, infiltrating the fiber preform with a molten material comprising silicon to form an infiltrated fiber preform; and, after the infiltration, exposing the infiltrated fiber preform to a gas comprising nitrogen, thereby forming a ceramic matrix composite having a surface configured for easy nodule removal.

A second aspect relates to the method of the first aspect, wherein, during the cooling of the infiltrated fiber preform, a surface layer comprising silicon nitride is formed on the surface of the ceramic matrix composite.

A third aspect relates to the method of the second aspect, wherein the surface layer is discontinuous over the surface of the ceramic matrix composite.

A fourth aspect relates to the method of the second, wherein the surface layer is continuous over the surface of the ceramic matrix composite.

A fifth aspect relates to the method of any of the preceding aspects, wherein the surface layer comprises a thickness in a range from about 1 nm to about 100 nm.

A sixth aspect relates to the method of any of the preceding aspects, wherein, during the cooling, molten silicon from an interior of the infiltrated fiber preform is pushed outward due to volumetric expansion, thereby forming substantially spherical silicon nodules on the surface of the ceramic matrix composite.

A seventh aspect relates to the method of the sixth aspect, wherein one or more of the silicon nodules is at least partially encapsulated by a silicon nitride coating.

An eighth aspect relates to the method of the sixth or seventh aspect, further comprising, after the cooling, removing the silicon nodules from the surface layer without machining or heat treatment.

A ninth aspect relates to the method of any preceding aspect, wherein, during the cooling, the infiltrated fiber preform is cooled from the temperature at or above the melting temperature of silicon to ambient temperature.

A tenth aspect relates to the method of any preceding aspect, wherein the exposure to the gas comprising nitrogen occurs during an entirety of the cooling.

An eleventh aspect relates to the method of the tenth aspect, wherein the exposure to the gas comprising nitrogen occurs during only an initial phase of the cooling, from the temperature at or above the melting temperature of silicon to a second temperature above ambient temperature.

A twelfth aspect relates to the method of the eleventh aspect, wherein the second temperature is at or above about 1200° C.

A thirteenth aspect relates to the method of any preceding aspect, wherein the gas comprising nitrogen comprises $N_2$ and/or $NH_3$.

A fourteenth aspect relates to the method of any preceding aspect, wherein the gas further comprises an inert gas selected from the group consisting of Ar, He, and Ne.

A fifteenth aspect relates to the method of any preceding aspect, wherein the cooling is carried out in a controlled environment substantially devoid of oxygen.

A sixteenth aspect relates to the method of the fifteenth aspect, wherein the controlled environment comprises a pressure of 500 Pa or less.

A seventeenth aspect relates to the method of any preceding aspect, wherein the fiber preform is an impregnated fiber preform, and further comprising, prior to the heating, infiltrating the fiber preform with a slurry comprising ceramic particles to form the impregnated fiber preform; wherein the ceramic fibers comprise silicon carbide and the ceramic matrix composite includes a ceramic matrix comprising silicon carbide; and wherein a component of a gas turbine engine comprises the ceramic matrix composite.

An eighteenth aspect relates to a ceramic matrix composite (CMC) component having a surface configured for nodule removal, the CMC component comprising: a ceramic matrix composite comprising a ceramic matrix reinforced with silicon carbide fibers, the ceramic matrix comprising silicon carbide; and a surface layer comprising silicon nitride on the ceramic matrix composite.

A nineteenth aspect relates to the CMC component of the eighteenth aspect, wherein the surface layer comprises a thickness in a range from about 1 nm to about 100 nm.

A twentieth aspect relates to the CMC component of the eighteenth or nineteenth aspects, wherein the surface layer is discontinuous over a surface of the ceramic matrix composite.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of altering a surface of a ceramic matrix composite to aid in nodule removal, the method comprising:
    heating a fiber preform comprising a framework of ceramic fibers to a temperature at or above a melting temperature of silicon;
    during the heating, infiltrating the fiber preform with a molten material comprising silicon, forming an infiltrated fiber preform;
    after the infiltration, cooling the infiltrated fiber preform from the temperature at or above the melting temperature to ambient temperature, and
    during the cooling, exposing the infiltrated fiber preform to a gas comprising nitrogen,
    wherein the exposure to the gas comprising nitrogen occurs during only an initial phase of the cooling, from the temperature at or above the melting temperature of silicon to a second temperature above the ambient temperature, the second temperature being at or above about 1200° C., the exposure to the gas comprising nitrogen being halted at the second temperature, and
    further comprising:
    after reaching the second temperature and halting the exposure to the gas comprising nitrogen, exposing the infiltrated fiber preform to a vacuum or inert gas atmosphere for a duration of the cooling of the infiltrated fiber preform to the ambient temperature,
    thereby forming a ceramic matrix composite having a surface configured for nodule removal.

2. The method of claim 1, wherein, during the cooling of the infiltrated fiber preform, a surface layer comprising silicon nitride is formed on the surface of the ceramic matrix composite.

3. The method of claim 1, wherein, during the cooling, molten silicon from an interior of the infiltrated fiber preform is pushed outward due to volumetric expansion, thereby forming substantially spherical silicon nodules on the surface of the ceramic matrix composite.

4. The method of claim 3, wherein one or more of the silicon nodules is at least partially encapsulated by a silicon nitride coating.

5. The method of claim 3, further comprising, after the cooling, removing the silicon nodules from the surface layer without machining or heat treatment.

* * * * *